US006544039B2

(12) United States Patent
Fiedorowicz et al.

(10) Patent No.: US 6,544,039 B2
(45) Date of Patent: Apr. 8, 2003

(54) METHOD OF TEACHING READING

(75) Inventors: Christina Fiedorowicz, Woodlawn (CA); Ronald Trites, Woodlawn (CA); Peter Cleary, Gloucester (CA); Rene Faucher, Gloucester (CA); Douglas MacGregor, Ottawa (CA); Richard Stanton, Ottawa (CA)

(73) Assignee: Autoskill International Inc., Ottawa (CA)

( * ) Notice: Subject to any disclaimer, the term of this patent is extended or adjusted under 35 U.S.C. 154(b) by 129 days.

(21) Appl. No.: 09/726,550

(22) Filed: Dec. 1, 2000

(65) Prior Publication Data
US 2002/0098463 A1 Jul. 25, 2002

(51) Int. Cl.[7] ............................................. G09B 11/00
(52) U.S. Cl. .................... 434/167; 434/185; 434/307 R
(58) Field of Search ................. 434/350, 236, 434/322, 323, 167, 178, 185; 706/327

(56) References Cited

U.S. PATENT DOCUMENTS

| 5,957,699 A | | 9/1999 | Peterson et al. ............. 434/350 |
| 6,052,512 A | | 4/2000 | Peterson et al. ........... 395/200.5 |
| 6,064,856 A | * | 5/2000 | Lee et al. .................... 434/323 |
| 6,077,085 A | * | 6/2000 | Parry et al. .................. 434/118 |
| 6,146,147 A | * | 11/2000 | Wasowicz .................... 434/118 |
| 6,299,452 B1 | * | 10/2001 | Wasowicz et al. ........... 434/156 |
| 6,322,366 B1 | * | 11/2001 | Bergan et al. ............... 434/118 |
| 2002/0076675 A1 | * | 6/2002 | Budra et al. ................ 434/167 |

OTHER PUBLICATIONS

C.A.M. Fiedorowicz et al., "An Evaluation of the Effectiveness of Computer–Assisted Component Reading Subskills Training", pp. 1–225.
C.A.M. Fiedorowicz, "Training of Component Reading Skills", pp. 318–334.
C.A.M. Fiedorowicz et al., "Follow–Up Study of the Effectiveness of the Autoskill CRS Program", pp. 1–96.
"Findings of Fact and Conclusions of Law", In the United States District Court for the District of New Mexico, CV91–0740M.

* cited by examiner

*Primary Examiner*—Joe H. Cheng
*Assistant Examiner*—Kathleen M Christman
(74) *Attorney, Agent, or Firm*—Marks & Clerk

(57) ABSTRACT

A computer-based method of providing reading instruction to a student. The software program implemented in a computer-based environment provides a balanced approach to reading based on different programmed components namely phonemic awareness reading subskills and reading comprehension. The program sets out a predefined sequence which incorporates the aforementioned components in a manner which develops enhanced reading ability and improved comprehension.

32 Claims, 3 Drawing Sheets

METHOD OF TEACHING READING

FIELD OF THE INVENTION

The present invention relates to a method of teaching reading skills and in particular to a computer based method involving a balanced approach to such instructions.

BACKGROUND

Considerable effort has been devoted, in the past number of years, into developing methods for teaching students how to read. Unfortunately, most of the conventional methods, including known computer based methods, focus on a single technique for teaching all readers, ignoring the fact that each student has different strengths and weaknesses.

Research by experts in the field and, in particular that of Dr. Christina Fiedorowicz and Dr. Ronald Trites, has demonstrated the need for a balanced approach to reading instruction. This balanced approach involves providing all of the basic skills necessary to develop effective reading skills, and is normally divided into three different program components: phonemic awareness, reading subskills, and reading comprehension.

Phonemic awareness is the understanding that speech is composed of a series of individual speech sounds called phonemes, and to read successfully words are broken down into sounds, for example the word "cat" is broken down into separate phoneme -/k/, /a/, and /t/.

Reading subskills incorporate several concepts including automaticity and reading subtypes. A task analytic approach is used to deliver both the assessment and intervention requirements to remediate students with reading disabilities or those wishing to accelerate skill development. This overall approach creates a structural and sequential methodology for effectively addressing poor decoding and component reading skills that ultimately leads to improvements in reading comprehension.

The final phase of the training involves reading comprehension, which challenges the students to use the skills learned in the two previous phases in comprehension exercises.

However, the implementation of such a balanced reading program comes at a cost. For most teachers, assigning and modifying training of a small group of students is manageable. The proliferation of computers and an increased awareness of students with reading difficulties make the small group environment much less commonplace.

Typically, this new atmosphere requires educators to sacrifice program efficiency in order to accommodate more students. In order to maintain the efficacy of a balanced approach to reading instruction in a computer lab with 20 or more workstations, the teacher's role as technical, and pedagogical administrator must be significantly re-aligned. If it is not, teachers run the risk of providing incomplete, unbalanced and inconsistent instruction.

The more basic principles of teaching reading skills have been known for some time. However, the most effective way of implementing these principles into a classroom or computer laboratory setting, so that a large number of students at a variety of different reading levels can reap the full benefit of these principles, is still under study.

One of the earlier computer based programs which relies on teacher input was developed by the present Assignee and provides a reading program based primarily upon the identification of three reading sub-types of students who were experiencing reading difficulties. The three sub-types are, Type O (oral reading), Type A (intermodal-associative deficit), and Type S (sequential deficit). The program improves the rapid automatic responses of the student to the training stimuli which are broken down in a particular way to train students who belong to the different sub-types. For more information relating to this earlier program reference may be made to the Findings of Fact and Conclusions of Law delivered by the United States District Court For The District Of New Mexico under court docket No. 91-960-M Civil, the contents of which are herein incorporated by reference.

SUMMARY OF THE INVENTION

The present invention provides, in a first aspect, a computer based method of teaching reading skills to a student comprising the steps of determining which one of a series of predetermined training streams is appropriate for the student, based on the student's grade level; providing a series of phonemic awareness exercises; providing a series of reading subskill exercises providing a series of reading comprehension exercises; running on a computer the appropriate training stream, which includes: alternating between at least one phonemic awareness exercise and at least one reading subskill exercise until all of the phonemic awareness exercises are mastered; alternating between at least one reading subskill, exercise and at least one reading comprehension exercise until all of the reading subskill exercises are mastered; and mastering remaining reading comprehension exercises; wherein a pre-determined level of mastery must be achieved on each exercise before proceeding to the next exercise.

In another aspect, the present invention provides a computer-based method of teaching reading skills to a student comprising the steps of: determining which one of a series of predetermined training streams is appropriate for the student, based on the student's grade level compared to the student's reading level as determined by a Cloze paragraph test; providing a series of phonemic awareness exercises; providing a series of reading subskill exercises; providing a series of reading comprehension exercises; running on a computer the appropriate training stream, which includes: alternating between at least one phonemic awareness exercise and at least one reading subskill exercise until all of the phonemic awareness exercises are mastered; alternating between at least one reading subskill exercise and at least one reading comprehension exercise until all of the reading subskill exercises are mastered; and mastering remaining reading comprehension exercises; wherein a predetermined level of mastery must be achieved on each exercise before proceeding to the next exercise; when the student's reading level is two or more levels below the student's grade level.

In yet another aspect, the present invention provides a computer based method of teaching reading skills to a student comprising the steps of: determining which one of a series of predetermined training steams is appropriate for the student, based on the student's grade level compared to the student's reading level as determined by a Cloze paragraph test; providing a series of reading subskill exercises; providing a series of reading comprehension exercises; running on a computer the appropriate training stream, which includes: alternating between at least one subskill exercise and at least one reading comprehension exercise until all of the subskill exercises are mastered; and mastering remaining reading comprehension exercises; wherein a pre-determined level of mastery must be achieved on each exercise before proceeding to the next exercise; when the student's reading level is one level below, equal to, or greater than the student's grade level.

BRIEF DESCRIPTION OF THE DRAWINGS

The invention will now be described in greater detail having reference to the attached drawings wherein.

DETAILED DESCRIPTION OF THE INVENTION

Figure 1:
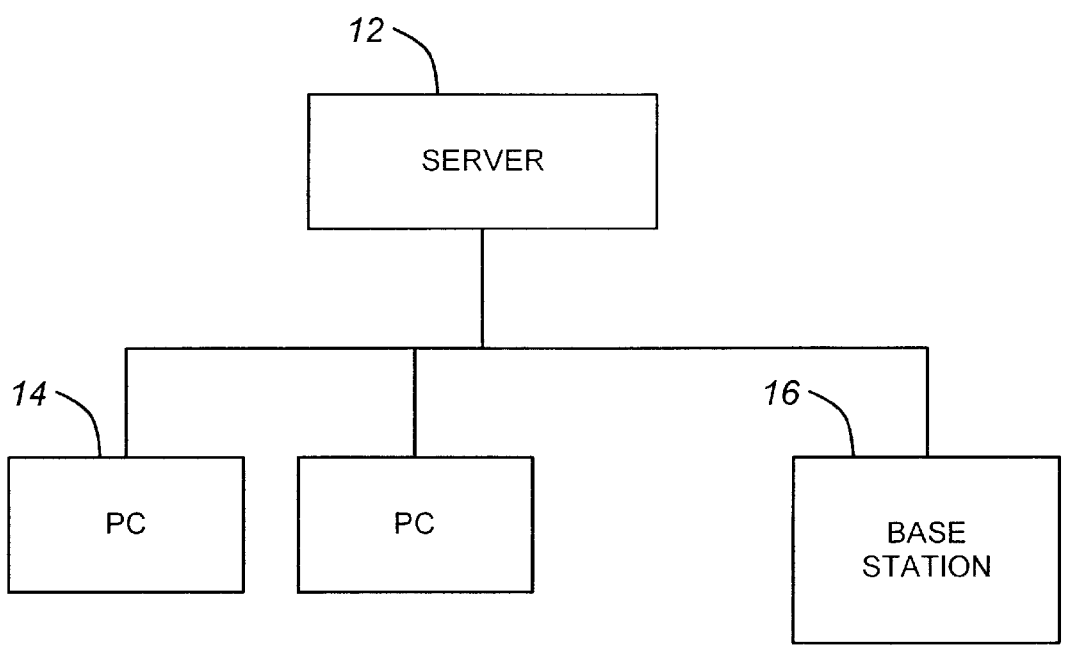
FIG. 1 is a block diagram of a local area network of the type that may be used to deliver the program of the present invention.

The present invention relates to a balanced approach to reading that is intended to help students that have failed to achieve the skills required to develop comprehension abilities. The reading program of the present invention is embodied in a computer readable format for installation in a stand-alone computer such as a P.C. or in a central server for access by a plurality of computers in a local area network (LAN) environment. FIG. 1 is a block diagram illustrating generally, a LAN implementation in a school environment. The program is is installed in server 12 and individual sites or PCs 14 are linked to the server for use by students in a computer lab or classroom. The teacher or administrator may have a base station 16. It will be apparent to one familiar with information technology that the program distribution can be implemented in many different ways and the system shown in FIG. 1 is intended to show one possible example.

The computer based reading program builds phonemic awareness, develops students' decoding skills and improves their comprehension abilities. The program's modular design allows teachers to retrieve and review records relating to students' progress and customize the students' instructions in the appropriate areas based on their individual requirements. The program also provides flexibility whereby teachers administering the program can use textbooks and other related software products to stimulate students' appreciation for literature while training their minds to understand written languages. It is understood that certain learning systems require a particular level of reading ability in order for the student to understand the curriculum. The present invention relates to a program to ensure that students are reading at the required level. The program is based on individualized student testing and the development of a customized training courses based on the results of this testing. These results are complemented by an extensive management system to support teaching and administrative functions.

Figure 2:
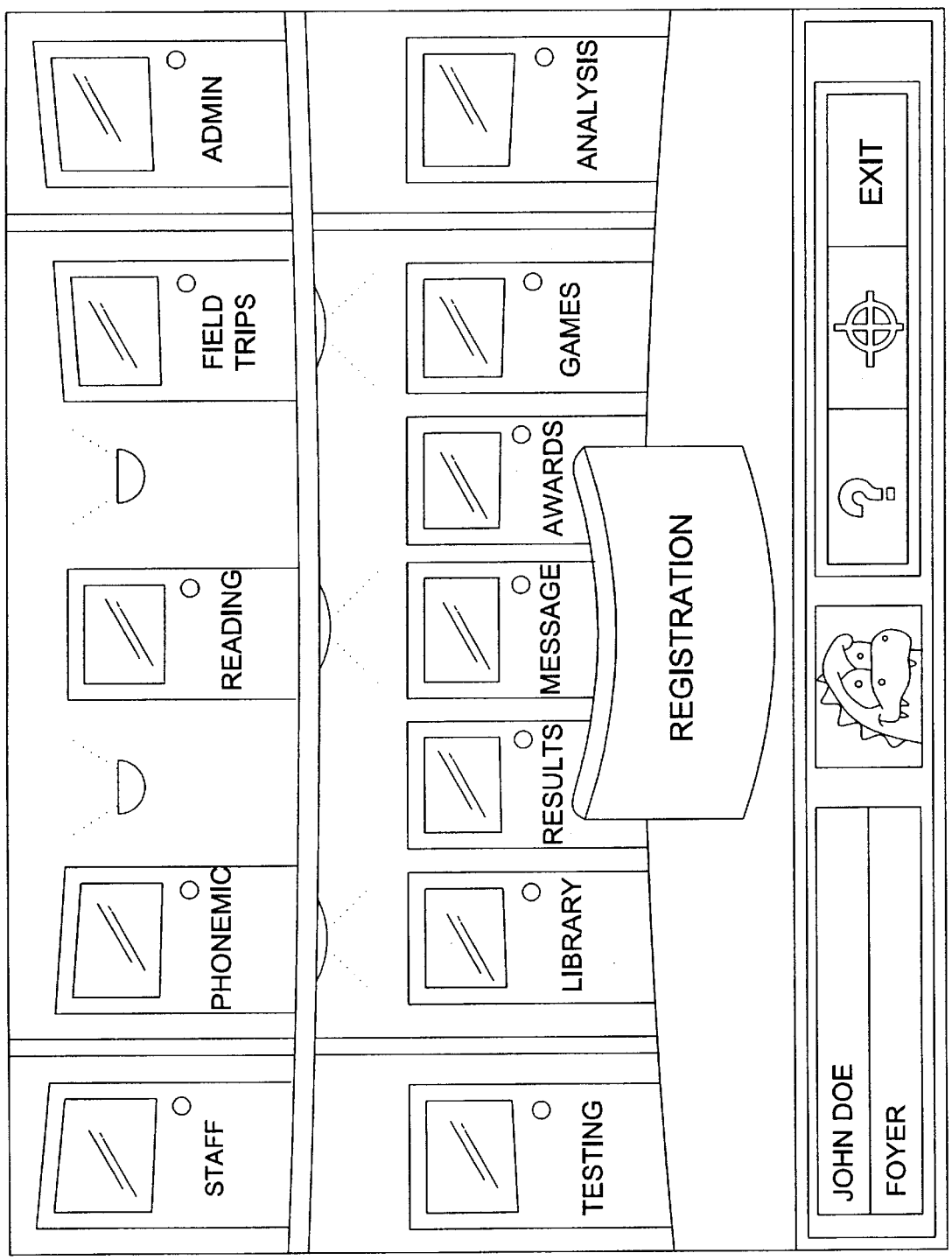
FIG. 2 is an illustration of a monitor screen showing various administrative and academic functions performed by the present system.

FIG. 2 shows an example of a screen presentation delivered by the program. This display, called the foyer, reveals some of the options and functions provided by the program. From this screen a teacher or program administrator can register the student, assign a password, coordinate testing and training, and access on-line help. Once registered, students can log into and out of the program, enter rooms for which they have been assigned access, or call up one of the full-motion animated video guides. With the aid of recorded natural speech these guides provide encouragement and motivation, and help the student move through the program.

Figure 3:
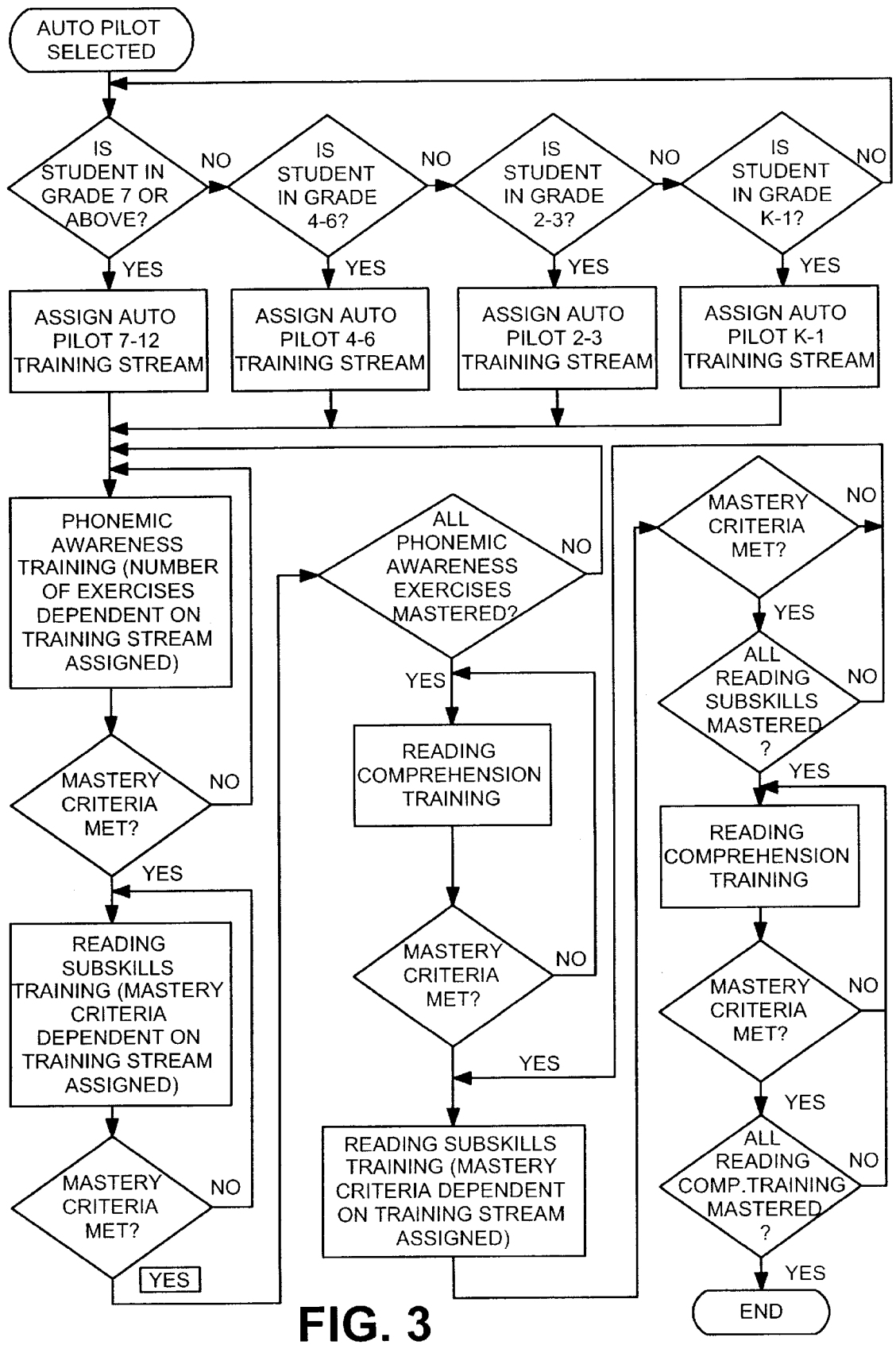
FIG. 3 is a flow diagram illustrating one embodiment of the teaching program.

The method of the present invention is designed to teach or enhance the reading stills of students at any level. To accomplish this the system has a number of different training streams designed for students at different age and reading levels Accordingly, the first step in the method of the present invention is to assess the reading level of the student and thereby determine the appropriate training stream. In the system's simplest form, developed for general use, the training stream is determined solely by the grade level of the student. FIG. 3 is a flow diagram depicting the training sequences according to this training stream. The sequence set out in the flow diagram are almost entirely automated rather than requiring specific input from the teachers administering the program as was necessary in the prior programs.

In other embodiments of the system each student undergoes a Cloze reading level assessment test, and an appropriate training stream is determined based on the student's grade level and Cloze reading level. The Cloze reading level assessment test, in brief, judges a student's reading level based on the ability to correctly add missing words to a paragraph.

The following is an example of the possible training streams:

First: Student Grade Level=Kindergarten or Grade 1.
   Cloze Level=not a factor in this stream
Second: Student Grade Level=Grade 2 or 3.
   Cloze Level=not a factor in this stream
Third: Student Grade Level=Grade 4 or 5.
   Cloze Level=two or more levels behind grade level
Fourth: Student Grade Level=Grade 4 or 5.
   Cloze Level=one level behind or better than grade level
Fifth: Student Grade Level Grade=6 to 12.
   Cloze Level=two or more levels behind grade level
Sixth: Student Grade Level=Grade 6 to 12.
   Cloze Level=one level behind or better than grade level
Seventh: For students in grade 13 or higher, the grade 6 to 12 training logic is used, but the content is updated for an adult.

After the appropriate training stream is determined, the method according to the embodiment of the present invention involves running an integrated program of phonemic awareness, reading subskills, and reading comprehension exercises. The difficulty of these exercises is based on the determined training stream. The exercises are in developmental sequences, with each exercise representing an incremental step forward on a continuum of reading skill development.

Initially the training stream alternates between one or more phonemic awareness exercises and one or more reading subskill exercises. Once all the phonemic awareness exercises are mastered the training stream alternates between one or more reading subskill exercises and one or more reading comprehension exercises.

Preferably, a single phonemic awareness exercise is followed by a single reading subskill exercise, thereby ensuring that the student experiences a variety of different exercises and that the student learns the basic skills in a natural progression. However, in some training streams the number of phonemic awareness exercises does not equal the number of reading subskill exercises. Moreover, in most training streams the number of reading subskill exercises is far greater than the number of reading comprehension exercises.

To complete any exercise it must be mastered with a substantial level of accuracy. The mastery criteria for the reading subskill exercises also include a latency or automaticity aspect, whereby nor only must the student obtain a high level of accuracy, but they also must have a consistent response time. For example, in a preferred embodiment, each exercise is divided into a series of trials with 50 items. After each trial the average response time for the items in the trial is calculated. To master the exercise the student must record three consecutive average response times that are within a preset range, e.g. 100 milliseconds. The actual speed of response is not the important factor since different students well naturally have different response times. The theory of automaticity suggests that the basic components of reading (i.e. letters, syllables and words) must not only be learned, but learned to a very rapid skill level, whereby processing then becomes automatic. This automaticity is reflected in consistently fast average response times.

To offer a comprehensive skill set for student training, a combination of task-analytic and process-oriented approaches has also been incorporated into the present invention. In task analysis, complex tasks are broken down into component parts. If the simpler component skills are learned well, the reader is better prepared to focus on the more difficult or complex tasks. During the reading subskill exercises, letters, letter combinations, syllables progressing to words of different phonetic and orthographic patterns, phases, and finally sentences are learned, to ensure that the student has mastered key component skills required to he an effective reader. This allows the student to comprehend the greater meaning of the text they are reading without having to concentrate on the decoding of individual words. An example of a set of reading subskill exercises is detailed in the following table.

| Component Skill | Visual Matching | Auditory-Visual Matching | Oral Reading |
|---|---|---|---|
| Letter Names | X | X | X |
| Letter Sounds | | X | X |
| CV/VC Syllables | X | X | X |
| CVC Syllables | X | X | X |
| CVC Words | X | X | X |
| CVCV Syllables | X | X | X |
| CVCV Words | X | X | X |
| CCVC Syllables | X | X | X |
| CCVC Words | X | X | X |
| CVCC Syllables | X | X | X |
| CVCC Words | X | X | X |
| CVVC Group 1 Syllables | X | X | X |
| CVVC Group 1 Words | X | X | X |
| CVVC Group 2 Syllables | X | X | X |
| CVVC Group 2 Words | X | X | X |
| Level 1 to Level 10 Words | X | X | X |
| Phrases | | | X |
| Level 1 to 10 Sentences | | | X |

Students not only receive instruction in component skills, but are given the opportunity to practice the use of these skills in comprehension exercises. The present embodiment of the invention includes a set of paragraphs to help students enhance their comprehension abilities. The comprehension exercises help students develop strategies for better comprehension, including the development of a reading vocabulary, and the ability to identify the main idea, understand relationships, make inferences, and retain specific facts.

According to a preferred embodiment of the present invention, the learning process is enhanced by the immediate positive reinforcement of correct answers. One of several animated character guides shown in FIG. 2, which is selected by the student, helps, directs and encourages the student throughout the exercises. An electronic award is given to student after mastery of each skill or activity. Printable certificates correspond to each award.

To avoid excessive frustration and to notify the teacher of a problem, when a student fails a certain exercise more than a predetermined number of times, the program is put on hold and the student is prompted to seek help from their supervisor. In a fully integrated system, the supervisor also receives notification at their base station that one of the student terminals is on hold. Furthermore, in a fully integrated system, complete results of the exercises for each student are sent to the base station, where they are stored in memory for subsequent review. In a preferred embodiment the number of results to be stored are capped at a preset value, such as the 25 most recent, and the previous results may be cached.

The following example, which sets out chronological sequence of exercises for various grade levels as contemplated by the present invention provide practical implementation protocols of the reading program according to the invention.

AutoTest Button Training: Chronological Sequence of Exercises: Grade 6–12 Option All Grade 6 through 12 students will complete a Cloze Paragraph Assessment then they are placed as follows: If student scores a basal reading level of more than one grade level (two or more) behind their actual grade level, then training exercises will follow this sequence:

1) Phonemic Awareness Training—Word Matching (Rhyming)
2) Visual Match Training—Letters
3) Phonemic Awareness Training—Word Matching (Beginning)
4) Visual Match Training—CV/VC non-Words
5) Phonemic Awareness Timing—Word Matching (Ending)
6) Visual Match Training—CVC non-Words
7) Phonemic Awareness Training—Sound Matching (Beginning)
8) Visual Match Training—CVC Words
9) Phonemic Awareness Training—Sound Matching (Ending)
10) Visual Match Training—CVCV non-Words
11) Phonemic Awareness Training—sound Matching (Middle)
12) Visual Match Training—CVCV Words
13) Phonemic Awareness Training—Blending (3 Phonemes)
14) Visual Match Training—CCVC non-Words
15) Phonemic Awareness Training—Blending (4 Phonemes)
16) Visual Match Training—CCVC Words
17) Phonemic Awareness Training—Segmentation (3 Phonemes)
18) Visual Match Training—CVCC non-Words
19) Phonemic Awareness Training—Segmentation (4 Phonemes)
20) Visual Match Training—CVCC Words 21) Visual Match Training—CVVC non-Words—1
22) visual Match Training—CVVC Words—1
23) Visual Match Training—CVVC non-Words—2
24) Visual Match Training—CVVC Words—2
25) Visual Match Training—Words at Level One
26) Visual Match Training—Words at Level Two
27) Visual Match Training—Words at Level Three
28) Visual Match Training—Words at Level Four
29) Visual Match Training—Words at Level Five
30) Visual Match Training—Words at Level Six
31) Visual Match Training—Words at Level Seven
32) Visual Match Training—Words at Level Eight
33) Visual Match Training—Words at Level Nine
34) Visual Match Training—Words at Level Ten
35) Auditory-Visual Match Training—Letter Names
36) Auditory-Visual Match Training—Letter Sounds
37) Auditory-Visual Match Training—CV/VC non-Words
38) Auditory-Visual Match Training—CVC non-Words
39) Auditory-Visual Match Training—CVC Words
40) Auditory-Visual Match Training—CVCV non-words
41) Auditory-Visual Match Training—CVCV Words
42) Auditory-Visual Match Training—CCVC non-Words
43) Auditory-Visual Match Training—CCVC Words
44) Auditory-Visual Match Training—CVCC non-Words
45) Auditory-Visual Match Training—CVCC Words
46) Auditory-Visual Match Training—CVVC non-Words—1
47) Auditory-Visual Match Training—CVVC Words—1
48) Auditory-Visual Match Training—CVVC non-Words—2
49) Auditory-Visual Match Training—CVVC Words—2
50) Auditory-Visual Match Training—Words at Level One
51) Silent Reading Comprehension—Paragraphs at Level One
52) Auditory-Visual Match Training—Words at Level Two
53) Silent Reading Comprehension—Paragraphs at Level Two
54) Auditory-Visual Match Training—Words at Level Three.
55) Silent Reading Comprehension—Paragraphs at Level Three
56) Auditory-Visual Match Training—Words at Level Four
57) Silent Reading Comprehension—Paragraphs at Level Four
58) Auditory-Visual Match Training—Words at Level Five
59) Silent Reading Comprehension—Paragraphs at Level Five
60) Auditory-Visual Match Training—Words at Level Six
61) Silent Reading Comprehension—Paragraphs at Level Six
62) Auditory-Visual Match Training—Words at Level Seven
63) Silent Reading Comprehension—Paragraphs at Level Seven
64) Auditory-Visual Match Training—Words at Level Eight
65) Silent Reading Comprehension—Paragraphs at Level Eight
66) Auditory-Visual Match Training—Words at Level Nine
67) Silent Reading Comprehension—Paragraphs at Level Nine
68) Auditory-Visual Match Training—Words at Level Ten
69) Silent Reading Comprehension—Paragraphs at Level Ten In a further embodiment of the invention, the training streams are modified if the student's reading level is one level below, equal to, or greater than the student's grade level as determined by the Cloze paragraph test. In this embodiment the series of phonemic awareness exercises are omitted from the training stream.

Although particular embodiments of the invention have been discussed and illustrated it will be apparent to one skilled in the art that numerous changes can be made to these embodiments without departing from the basic concept of the invention. It is so be understood, however, that such changes will fall within the true scope of the invention as defined by the appended claims.

We claim:

1. A method of teaching reading skills to a student utilizing a computer based training program, the computer having, means to implement the training program, a monitor screen to present visual instructions, means to provide auditory instructions, and interactive means to allow the student to respond to visual and auditory instructions, the method comprising:

selecting from the training program one of a series of predetermined training streams based on the student's grade level;

implementing the selected series of training streams on the computer, the series of training streams including: a series of phonemic awareness exercises; a series of reading subskill exercises, said subskill exercises including at least a visual matching of a combination of letters having at least one vowel and at least one consonant; and a series of reading comprehension exercises; and presenting the respective series of exercises to the student in a developmental sequence such that at least one of said series of phonemic awareness exercises is alternated with at least one of said series of reading subskill exercises until all of said series of phonemic awareness exercises is mastered based on a phonemic awareness mastery criteria level defined in the training stream, followed by at least one of said series of reading subskill exercises alternated with at least one of said series of reading comprehension exercises until all of said series of reading subskill exercises are mastered based on a reading subskill mastery criteria level defined in the training stream, followed by mastering at least one of said series of reading comprehension exercises based on a reading comprehension mastery criteria level defined in the training stream; wherein a predetermined level of mastery must be achieved on all of said series of respective exercises before proceeding to a next exercise in the developmental sequence.

2. The method according to claim 1, wherein the reading subskill mastery criteria level is based on a percentage of correct answers and a consistency off response times in the exercise.

3. The method according to claim 1, wherein the training stream is put on hold and the student is prompted to seek help when a predetermined number of failed attempts to master exercises has occurred.

4. The method according to claim 1, wherein a communication is sent to a base station when the selected training stream is put on hold.

5. The method according to claim 1, wherein a communication is sent to a base station when the selected training stream is completed.

6. The method according to claim 1, wherein the student's level of mastery of the selected training stream is stored in memory means.

7. The method according to claim 1, wherein the student's level of mastery of the selected training stream is sent to a base station for storage.

8. The method according to claim 1, wherein positive re-enforcement messages are transmitted to the student when a training stream is mastered.

9. The method according to claim 1, wherein the phonemic awareness exercises include at least one of the exercises selected from the group consisting of word matching, sound matching, blending, and segmentation.

10. The method according to claim 1, wherein the reading subskill exercises include at least one of the exercises selected from the group consisting of identifying letter names, identifying letter sounds, identifying letter combinations, identifying high-frequency words, and identifying high-frequency phrases.

11. The method according to claim 1, wherein the reading comprehension exercises include silent reading paragraphs.

12. A method of teaching reading skills to a student utilizing a computer based training program, the computer having, means to implement the training program, a monitor screen to present visual instructions, means to provide auditory instructions, and interactive means to allow the student to respond to visual and auditory instructions, the method comprising:
    determining the student's reading level based on a Cloze reading level assessment test;
    selecting from the training program one of a series of predetermined training steams, the training stream be selected based on the student's grade level and the student's reading level determined by the reading level assessment test, and when the student's reading level is two or more reading levels below the student's grade level;
    implementing the selected series of training streams on the computer, the series of training streams including: a series of phonemic awareness exercises; a series of reading subskill exercises, said subskill exercises including at least a visual matching of a combination of letters having at least one vowel and at least one consonant; and a series of reading comprehension exercises; and
    resenting the respective series of exercises to the student in a developmental sequence such that at least one of said series of phonemic awareness exercises is alternated with at least one of said series of reading subskill exercises until all of said series of phonemic awareness exercises is mastered based on a phonemic awareness mastery criteria level defined in the training steam, followed by at least one of said series of reading subskill exercises alternated with at least one of said series of reading comprehension exercises until all of said series of reading subskill exercises are mastered based on a reading subskill mastery criteria level defined in the training steam, followed by mastering at least one of said sales of reading comprehension exercises based on a reading comprehension mastery criteria level defined in the training stream; wherein a predetermined level of mastery must be achieved on all of said series of respective exercises before proceeding to a next exercise in the developmental sequence.

13. The method according to claim 12, wherein the reading subskill mastery criteria level is based on a percentage of correct answers and a consistency of response times in the exercise.

14. The method according to claim 12, wherein the training stream is put on hold and the student is prompted to seek help when a predetermined number of failed attempts to master exercises have occurred.

15. The method according to claim 14, wherein a communication is sent to a base station when the selected training stream is put on hold.

16. The method according to claim 12, wherein a communication is sent to a base station when the selected training steam is completed.

17. The method according to claim 12, wherein the student's level of mastery of the selected training stream is stored in memory means.

18. The method according to claim 17, wherein the student's level of mastery of the selected training stream is sent to a base station for storage.

19. The method according to claim 12, wherein positive re-enforcement messages are transmitted to the student when a training stream is mastered.

20. The method according to claim 12, wherein the phonemic awareness exercises include at least one of the exercises selected from the group consisting of word matching, sound matching, blending, and segmentation.

21. The method according to claim 12, wherein the reading subskill exercises include at least one of the exercises selected from the group consisting of identifying letter names, identifying letter sounds, identifying letter combinations, identifying high-frequency words, and identifying high-frequency phrases.

22. The method according to claim 12, wherein the reading comprehension exercises include silent reading paragraphs.

23. A method of teaching reading skills to a student utilizing a computer based training program, the computer having, means to implement the training program, a monitor screen to present visual instructions, means to provide auditory instructions, and interactive means to allow the student to respond to visual and auditory instructions, the method comprising:
    determining the student's reading level based on a Cloze reading level assessment test;
    selecting from the training program one of a series of predetermined training streams, the training steam be selected based on the student's grade level and the student's reading level determined by the reading level assessment test, and when the student's reading level is not less than one reading level below the student's grade level;
    implementing the selected series of training streams on the computer, the series of training streams including: a series of reading subskill exercises, said subskill exercises including at least a visual matching of a combination of letters having at least one vowel and at least one consonant; and a series of reading comprehension exercises; and
    presenting the respective series of exercises to the student in a developmental sequence such that at least one of said series of reading subskill exercises is alternated with at least one of said series of reading comprehension exercises until all of said series of reading subskill exercises are mastered based on a reading subskill mastery criteria level defined in the training stream, followed by mastering at least one of said series of reading comprehension exercises based on a reading comprehension mastery criteria level defined in the training stream; wherein a predetermined level of mastery must be achieved on all of said series of respective exercises before proceeding to a next exercise in the developmental sequence.

24. The method according to claim 23, wherein the reading subskill mastering criteria level is based on a percentage of correct answers and a consistency of response times in the exercise.

25. The method according to claim 23, wherein the training stream is put on hold and the student is prompted to seek help when a predetermined number of failed attempts to master exercises has occurred.

26. The method according to claim 25, wherein a communication is sent to a base station when the selected training stream is put on hold.

27. The method according to claim 23, wherein a communication is sent to a base station when the selected training stream is completed.

28. The method according to claim 23, wherein the student's level of mastery of the selected training steam is stored in memory means.

29. The method according to claim 28, wherein the student's level of mastery of the selected training stream is sent to a base station for storage.

30. The method according to claim 23, wherein positive re-enforcement messages are transmitted to the student when a training stream is mastered.

31. The method according to claim 23, wherein the reading subskill exercises include at least one of the exercises selected from the group consisting of identifying letter names, identifying letter sounds, identifying letter combinations, identifying high-frequency words, and identifying high-frequency phrases.

32. The method according to claim 23, wherein the reading comprehension exercises include silent reading paragraphs.

* * * * *